Dec. 11, 1934.  J. A. SPENCER  1,983,823
THERMOSTAT
Filed Sept. 6, 1932   3 Sheets-Sheet 1

John A. Spencer,
Inventor,
Delos F. Haynes,
Attorney.

Dec. 11, 1934.   J. A. SPENCER   1,983,823
THERMOSTAT
Filed Sept. 6, 1932   3 Sheets-Sheet 2

John A. Spencer,
Inventor,
Delos F. Haynes,
Attorney.

Dec. 11, 1934. J. A. SPENCER 1,983,823
THERMOSTAT
Filed Sept. 6, 1932 3 Sheets-Sheet 3

John A. Spencer,
Inventor,
Delos G. Haynes,
Attorney.

Patented Dec. 11, 1934

1,983,823

UNITED STATES PATENT OFFICE 1,983,823

THERMOSTAT

John A. Spencer, Newtonville, Mass., assignor to General Plate Company, Attleboro, Mass., a corporation of Massachusetts Application September 6, 1932, Serial No. 631,777

13 Claims. (Cl. 297—15)

This invention relates to thermostats, and with regard to certain more specific features, to thermostats operating with a sudden, snap motion.

Among the several objects of the invention may be noted the provision of an improved thermostat of the class indicated, having improved means for adjusting the temperature at which it operates; a thermostat of the class indicated which provides a utilizable, identical motion both in snapping from cold to hot, and from hot to cold positions; the provision of electrical and like controls in association with a thermostat of the class described; and the provision of a thermostat of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a top plan view of a thermostat embodying the present invention;

Similar reference characters indicate corresponding parts throughout the several views of the drawings.

Figure 1:
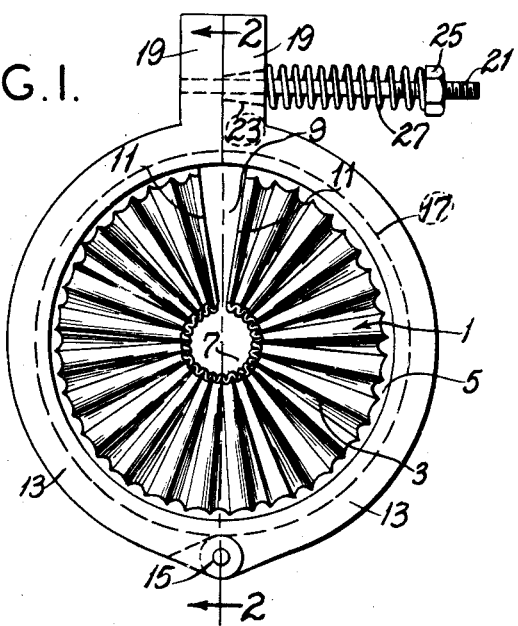

In my copending patent application Serial No. 463,961, filed June 26, 1930, now Patent No. 1,895,590, dated January 31, 1933, I have shown and claimed a thermostatic element comprising a radially corrugated disc of composite thermostatic metal, such as bimetal, the disc being initially provided with a dishing, or frusto-conical shaping in one direction. In my copending patent application Serial No. 516,042, filed February 16, 1931, now Patent No. 1,895,591, dated January 31, 1933, I have improved upon the said thermostat by providing it with a flat or non-corrugated confining peripheral rim. The present invention comprises an improvement in the construction, and operation, of these prior thermostats.

It is a fact that the operating characteristics of thermostats of the type disclosed in my said copending patent applications, especially the operating temperatures (that is, the temperatures at which the device snaps), is a function of the depth of dishing of the device. That is, considering the disc, basically, to be a conical frustum, the snapping temperature thereof is determined, at least in part, by the apex angle of the basic cone. The nearer said angle approaches 180°, the lower is the temperature required for snapping, until, at 180°, snapping is no longer possible at any temperature. Conversely the farther said apex angle departs from 180°, the greater is the temperature change required to snap the thermostat.

This phenomenon may be understood by considering the disc, first, as a simple, non-thermostatic overcentering device. Here it will be obvious that the externally applied force required to snap, or overcenter the device, will increase as the apex angle decreases from 180°, for, with the angle thus decreasing, more force is needed to compress the individual corrugations towards the central, flat, 180°-angle position through which they must pass in order to snap to the opposite position. When the disc is made thermostatic, by forming it of composite thermostatic metal, such as bimetal, the stresses set up in the bimetal through temperature changes are the functional equivalents of the externally applied force considered in connection with the simple non-thermostatic overcentering device. Such stresses are obviously proportional to the temperature change. Hence a disc wherein the apex angle is quite different from 180°, requiring more force to snap it, will require more temperature change (and thus a higher temperature) to operate.

In my said copending applications, the above-defined apex angle is definitely determined in the course of manufacture and is not, in the finished article, susceptible of much variation. It is the principal object of the present invention to provide a thermostat that is capable of having its apex angle varied, as well as means for effecting such variation, as will appear more fully hereinafter.

Referring now more particularly to Figs. 1 through 5, numeral 1 indicates a thermostatic disc of the general type shown in my said Patent No. 1,895,591. The thermostat of my said Patent No. 1,895,591 is used in the present invention in preference to the thermostat shown in my said Patent No. 1,895,590, for the advantages which distinguish said Patent No. 1,895,591 thermostat from said Patent No. 1,895,590 thermostat also obtain with the present invention. However, the thermostat of my Patent No. 1,895,590 may well be used in connection with the present invention.

Figure 2:
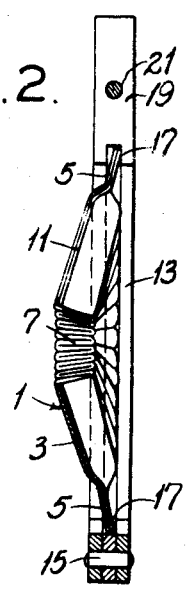
Fig. 2 is a cross section taken on line 2—2 of Fig. 1.
Figure 3:
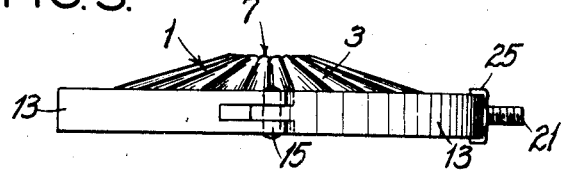
Fig. 3 is a side elevation of the thermostat of Fig. 1.
Figure 5:
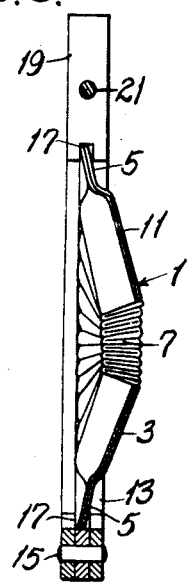
Fig. 5 is a cross section similar to Fig. 2, but showing the thermostat in a different operating phase.

Thermostat 1 comprises a central, radially corrugated portion 3 and a flat, uncorrugated rim portion 5. A central hole 7 is provided in the corrugated portion 3. As indicated in Figs. 2, 3, and 5, the thermostat 1 is preferably dished to a frusto-conical shape. Numeral 9 indicates a sector which has been cut from the thermostat 3. The edges 11 of the sector 9 are preferably radii of the disc. Considering the removed sector 9, it will be apparent that the fundamental shape of the thermostat 1 is that of the developed frustum of a cone. As the edges 11 of sector 9 are brought closer together, it will be apparent that the apex angle of the basic cone-shape of the thermostat is slowly made sharper, or decreased from 180°.

A mounting is provided for the thermostat 1, said mounting comprising an open ring. In this embodiment, the open ring comprises a pair of semi-circular elements 13, pivoted together at their ends as indicated at numeral 15, to form a generally circular shape. The inside peripheries of elements 13 are provided with grooves 17 (Fig. 2) in which the flat peripheral edge 5 of the thermostat 1 is received, preferably rather loosely. From the free edges of elements 15 extend a pair of projections 19, which, in the assembled mounting, face each other. Into one of the projections 19 is threaded a stud or screw 21, which extends freely through a suitable opening 23 in the other projection 19. A nut 25 is provided on the screw 21. Between the nut 25 and the outer face of projection 19 is provided a compression spring 27.

Figure 4:
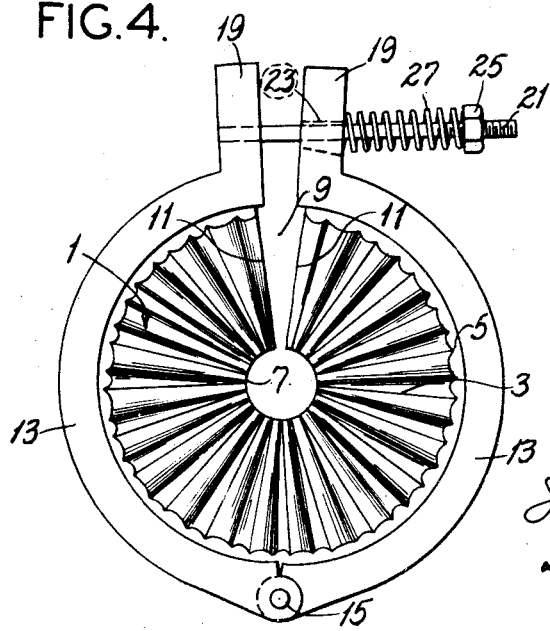
Fig. 4 is a top plan view similar to Fig. 1, but showing the thermostat in a different operating phase.
Figure 6:
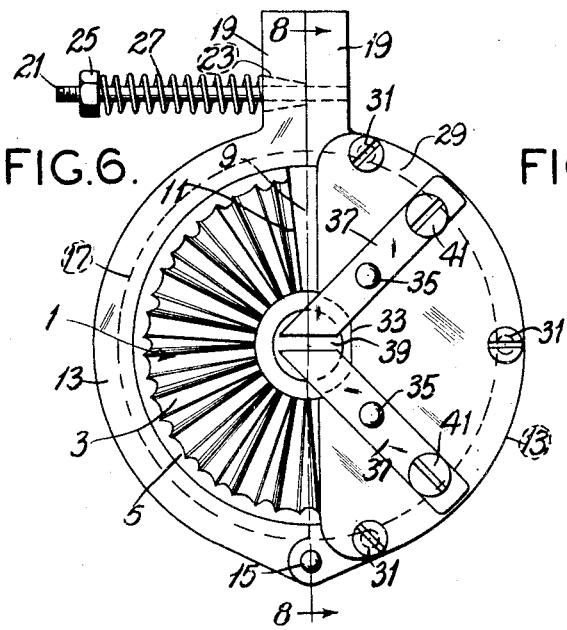
Fig. 6 is a top plan view of one form of electrical control embodying the present invention.
Figure 7:
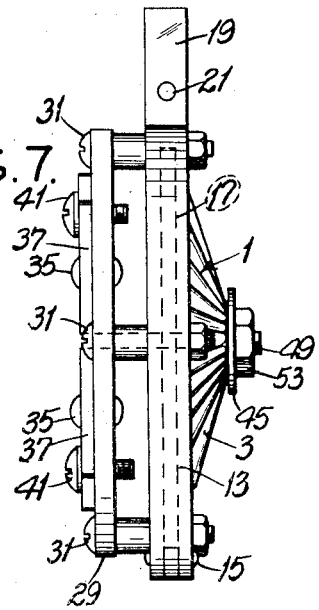
Fig. 7 is a side elevation of the control of Fig. 6.
Figure 8:
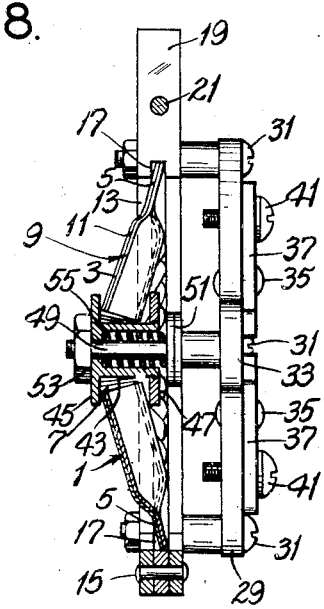
Fig. 8 is a cross section taken on line 8—8 of Fig. 6.

It will be seen that by regulating the position of the nut 25 on the screw 21, the extent to which said semi-circular elements 13 are brought together into complete circular position may be varied. For example, in Fig. 4 is indicated an arrangement in which the elements 13 are comparatively widely separated, while in Fig. 1 the elements 13 are brought completely together and form a complete circle. It will also be apparent that the nearer the elements 13 are brought to complete circular position, the closer the edges 11 of the sector 9 of the thermostat 1 are brought together, and hence the sharper the apex angle of the thermostat. Thus, by regulating the position of nut 25 on screw 21, the apex angle, and hence the temperature operating characteristics of the thermostat 1 may be varied at will.

The primary motion of thermostats of the type herein considered, which is utilized for effecting a control or the like, is the motion of the central part of the disc 1 as it snaps from one position, such as that shown in Fig. 2, to its position of opposite configuration, such as that shown in Fig. 5. In snapping, the said central portion of the thermostat undergoes a displacement roughly equal to twice the vertical height of its basic conical frustum, as will be apparent. This displacement, particularly with thermostats of the corrugated type herein considered, may be of a considerable amplitude, and hence accomplish a useful amount of work.

With the construction as herein described, however, a new, secondary motion is obtained in the snapping of the thermostat, which new motion is not present in the thermostats of my said Patents Nos. 1,895,590 and 1,895,591. This new motion may be described as follows: As the thermostat 1 snaps from one position of stability, such as that shown in Fig. 2, to its other position of stability, such as that shown in Fig. 5, it passes through a central condition of instability wherein the basic conic section is flattened to a plane. At this instant, there is present a very considerable radial expansion at the outer periphery. This radial expansion at the outer periphery at the instant when the disc is in its flat position of instability, reacts against the semi-circular mounting elements 13 and, for an instant, presses said elements apart on their hinged connection 15. This condition is also illustrated by Fig. 4, which may now be considered to represent the device of Fig. 1, without changing any adjustments thereon, at the instant that the conic section is flattened to a plane and the thermostat is in unstable position. This reaction upon the semi-circular elements 13 causes their free ends 19 to separate against the reaction of the compression spring 27. Thus, for an instant, when the thermostat snaps either from hot to cold or from cold to hot positions, the ends 19 of the elements 13 are separated through a clearly utilizable amplitude.

This additional motion is quite different from the heretofore acknowledged motion of the thermostatic element, for it is instantaneous only, at the time that the thermostat is in the course of snapping, and is an identical motion both when the thermostat is snapping from cold to hot position and when it is snapping from hot to cold position.

It will be obvious that the amplitude of this secondary motion may also be controlled by the degree of compression of the spring 27, brought about by manipulation of the nut 25 on screw 21, although this manipulation of nut 25 is primarily a control of the primary motion of the thermostat as above described.

Figs. 6 through 9 indicate an adaptation of the thermostat of the present invention to an electrical switch, this particular embodiment operating a switch upon the basis of the primary thermostatic motion as hereinabove described. Numeral 29 indicates a semi-circular plate of insulating material which is affixed as by bolts 31 to one of the semi-circular mounting elements 13. A central notch 33 in the plate 29 corresponds generally in shape to the central hole 7 of the thermostat 1. Upon the plate 29 are secured, as by rivets 35, a pair of stationary contact plates 37, which project over the notch 33, leaving a gap 39 therebetween. Screws or other suitable binding posts 41 provide means for connecting the switch in the circuit.

Through the central hole 7 of the thermostatic element 1 is passed a cylindrical element 43, having one end flange 45 permanently affixed thereon and an opposite end flange 47 screwed thereon. The elements 43, 45 and 47 embrace the interior periphery of the thermostatic disc 1 rather loosely, so as not to interfere with the temperature operating characteristics thereof. Through the center of cylindrical element 43 is passed a screw or bolt 49, which has a head 51 thereon. The head 51 is preferably of good contact material, such as silver, platinum or the like. To the other end of screw 49 is threaded a nut 53 which holds said screw in position on the element 43. A compression spring 55 reacts between the head 51 of the screw 49 and the flange 45 of the cylindrical element 43, and tends always to hold said head 51 in its fully extended position.

Figure 9:
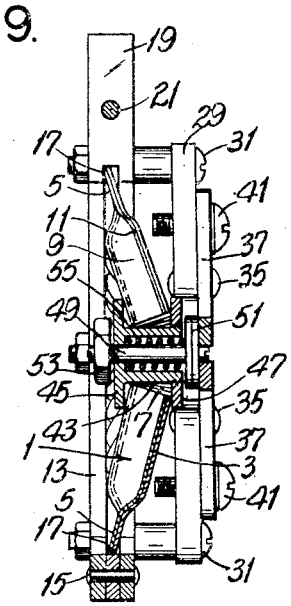
Fig. 9 is a cross section similar to Fig. 8, but showing the thermostat in a different operating phase.
Figure 10:
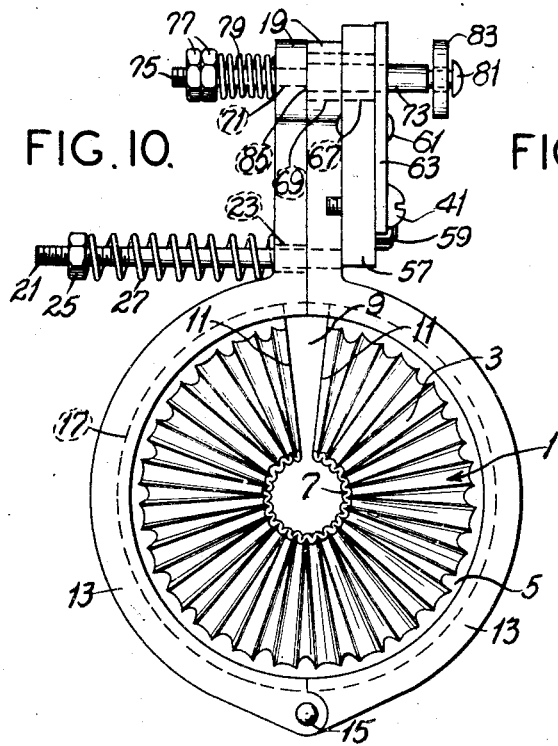
Fig. 10 is a top plan view of an alternative form of electrical control embodying the present invention.
Figure 11:
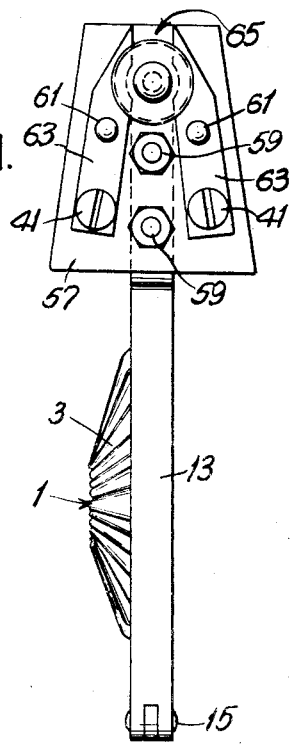
Fig. 11 is a side elevation of the control of Fig. 10.
Figure 12:
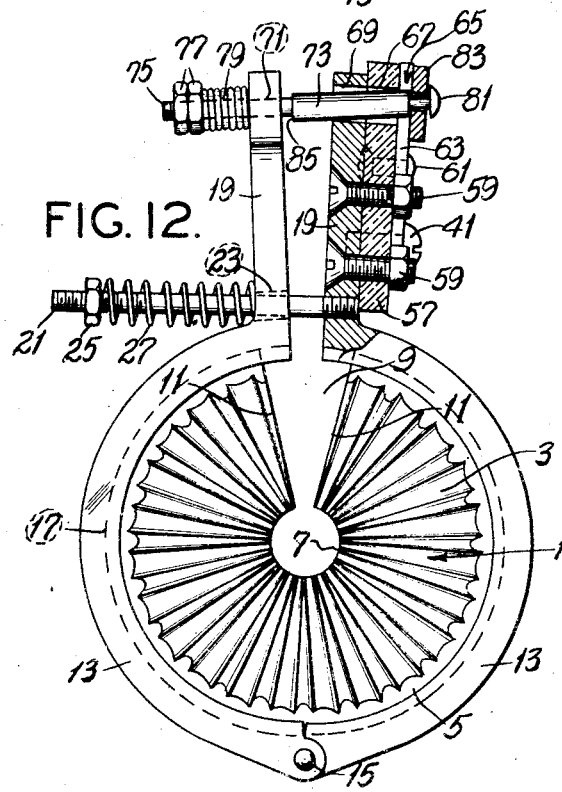
Fig. 12 is a top plan view, partly in section, similar to Fig. 10, but showing the control in a different operating phase.
Figure 13:
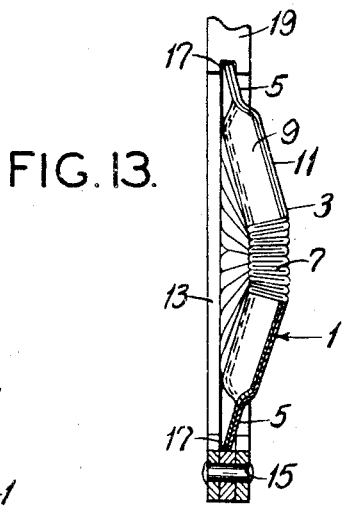
Fig. 13 is a fragmentary section of the control of Fig 10, but showing the control in a different operating phase.

The head 51 forms a movable contact bridging element for connecting together the stationary contact strips 37 across the gap 39 therebetween, when the thermostatic element 1 is in its circuit-connecting, stable position (Fig. 9). When the thermostat snaps to its other position (Fig. 8) the circuit is broken by removing of the movable contact 51. The spring 55, in the breaking of the circuit, functions to permit the thermostatic element to move a fraction of an inch prior to the time that contacts are broken, this tending to break the circuit with a light hammer blow, which is most desirable to minimize arcing and the like.

In Figs. 10 through 13 is shown an electrical control, embodying the thermostat of the present invention, in which the control is effected by the above-described secondary motion, rather than the primary motion. Referring to Figs. 10 through 13, numeral 57 indicates an insulating mounting plate, which is, in this embodiment, held to one of the projections 19 from the semi-circular elements 13 by suitable bolts or the like 59. On the insulating plate 57 are mounted, as by rivets 61, a pair of stationary contact strips 63, having a gap 65 between their ends. A hole 67 extends through the insulating plate 57, and continues as a hole 69 in the juxtaposed projection 19. In position facing said hole 69, still another hole 71, of lesser diameter, is provided in the other projection 19. Through the holes 67, 69 and 71 passes a pin 73, threaded at one end 75 to accommodate a pair of interlocking nuts 77. Between the nuts 77 and the outer face of projection 19 is provided a compression spring 79. On the other end of pin 73 is loosely mounted, by means of a head 81, a circular contact bridging element or button 83.

A shoulder 85 is provided on the pin 73, said shoulder 85 abutting the left-hand projection 19 to prevent said pin 73 from moving too far to the left under the influence of spring 79.

The action of this embodiment is as follows:

When the thermostatic element 1 is in either of its stable positions, the projections 19 are either juxtaposed against each other, or are separated only to a minimum extent. In this condition, the engagement of shoulder 85 with the inner face of projection 19 holds the pin 73 in such position that the contact bridging button 83 is displaced from the contact strips 63, and hence the circuit is broken. When, now, the thermostat 1 snaps to its opposite position of stability, the hereinbefore described secondary motion takes place, and the projections 19 are instantaneously separated through a comparatively wide amplitude. As this separation occurs, the contact strips 63 are brought into juxtaposition with the button 83, in such manner that said button 83 bridges the gap 65 and closes the circuit. As the thermostat 1 continues to snap to its opposite position of stability, as described above, the projections 19 again return to their position of minimum separation, and the strips 63 are again moved away from the bridging button 83 and the circuit is thus broken. As the circuit is broken, the spring 79 reacts in a manner similar to the spring 55 in the Fig. 8 embodiment and causes separation of the contacts with a light hammer blow.

In this embodiment, it will be seen, the circuit is completed only for an instant at each snapping of the thermostat, whether from hot to cold or from cold to hot positions. This instantaneous, intermittent closing of the circuit may well be employed to actuate a signal or the like.

The hereinbefore described embodiments shown in Figs. 6 through 13 constitute examples of the manner in which the thermostat of the present invention may be utilized to effect an electrical control. Other embodiments will likewise suggest themselves, for example, both primary and secondary movements of one thermostatic element might be utilized to effect electrical controls. In such event, the elements distinctive to the embodiment of Figs. 10 through 13 may merely be added to the embodiments shown in Figs. 6 through 9, or vice versa.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A thermostat comprising a radially corrugated disc of composite thermostatic material, said disc having a sector removed therefrom, and means for drawing the edges of said sector together, whereby said disc is rendered basically conical, said means comprising an element of open circular shape engaging said disc at the outer periphery thereof, and means for drawing the open ends of said element together.

2. A thermostat comprising a radially corrugated disc of composite thermostatic metal, said disc having two positions of stable equilibrium between which positions it snaps in response to temperature changes, during which snapping said disc sets up outwardly directed expansive forces at the periphery thereof, and means mounting said disc and responsive, by movement, to the said expansive forces.

3. A thermostat comprising a radially corrugated disc of composite thermostatic metal, said disc being basically conical in shape, and an open ring engaging said disc at the periphery thereof, said disc snapping from one to another position of stability in response to temperature change, and during said snapping, separating the open ends of the said open ring.

4. A thermostat comprising a radially corrugated disc of composite thermostatic metal, said disc being basically conical in shape, and an open ring engaging said disc at the periphery thereof, said disc snapping from one to another position of stability in response to temperature change, and during said snapping, separating the open ends of the said open ring, and adjustable compression means holding the open ends of said ring together.

5. A thermostat comprising a radially corrugated disc of composite thermostatic metal, said disc being basically conical in shape, and an open ring engaging said disc at the periphery thereof, said disc snapping from one to another position of stability in response to temperature change, and during said snapping, separating the open ends of the said open ring, said open ring comprising a pair of semicircular elements hinged together to form a substantially circular shape.

6. A thermostat comprising a radially corrugated disc of composite thermostatic metal, said disc being basically conical in shape, and an open ring engaging said disc at the periphery thereof, said disc snapping from one to another position of stability in response to temperature change, and during said snapping, separating the open ends of the said open ring, said open ring comprising a pair of semicircular elements hinged together to form a substantially circular shape, and provided at their free ends with abutting projections, and means resiliently holding said projections together.

7. A thermostat comprising a radially corrugated disc of composite thermostatic metal, said disc being basically conical in shape, and an open ring engaging said disc at the periphery thereof, said disc snapping from one to another position of stability in response to temperature change, and during said snapping, separating the open ends of the said open ring, and an abutment preventing said disc from snapping entirely to one of its positions of stability, said disc when engaging said abutment holding said open ends of the open ring apart until said disc again snaps to its other position of stability.

8. A thermostat comprising a radially corrugated disc of composite thermostatic metal having a basically conical shape, means mounting said disc at the periphery thereof, motion transmitting means carried by the movable central portion of said disc, stationary means positioned to cooperate with said motion transmitting means, and means for varying the apex angle of said conical shape, whereby to vary the temperature response characteristics of said disc.

9. A thermostat as set forth in claim 8 in which the disc has a segment removed therefrom, and means for drawing the edges of said segment together to a greater or less extent, said last-named means comprising the temperature-response-characteristics-varying means aforesaid.

10. A thermostat comprising a radially corrugated disc of composite thermostatic metal, said disc being basically conical in shape, an open ring engaging said disc at the periphery thereof, and cooperating motion-transmitting means carried by the open ends of said ring, said disc snapping from one to another position of stability in response to temperature change, and during said snapping, separating the open ends of said ring whereby to momentarily juxtapose said cooperating means.

11. A thermostat comprising a radially corrugated disc of composite thermostatic metal, said disc being basically conical in shape, an open ring engaging said disc at the periphery thereof, and cooperating motion-transmitting means carried by the open ends of said ring, said disc snapping from one to another position of stability in response to temperature change, and during said snapping separating the open ends of said ring whereby to momentarily juxtapose said cooperating means, and means for varying the apex angle of said conical shape, whereby to vary the temperature-response-characteristics of said disc.

12. A thermostat as set forth in claim 11 in which the disc has a segment removed therefrom, and means for drawing the edges of said segment together to a greater or less extent, said last-named means comprising the temperature-response-characteristics-varying means aforesaid.

13. A thermostat comprising a radially corrugated disc of composite thermostatic metal, said disc having two positions of stable equilibrium between which positions it snaps in response to temperature changes, during which snapping said disc sets up outwardly directed expansive forces at the periphery thereof, means mounting said disc, and means comprising a relatively stationary element and a motion-transmitting element mounted for movement coextensively with the expansive forces of the snapping disc.

JOHN A. SPENCER.